(12) United States Patent
Schlarb et al.

(10) Patent No.: US 6,218,456 B1
(45) Date of Patent: Apr. 17, 2001

(54) ANTICORROSION BINDERS COMPRISING PHOSPHATE OR PHOSPHONATE GROUPS

(75) Inventors: Bernhard Schlarb, Ludwigshafen; Harm Wiese, Heidelberg; Gerald Wildburg, Ludwigshafen; Maria Gyopar Rau, Hassloch, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/321,547

(22) Filed: May 28, 1999

(30) Foreign Application Priority Data

May 29, 1998 (DE) ................................................. 198 24 087

(51) Int. Cl.$^7$ ............................. C08F 2/24; C09D 157/00
(52) U.S. Cl. .................... 524/458; 524/461; 524/710; 526/193; 526/201
(58) Field of Search ..................... 524/458, 461, 524/804, 710; 526/193, 201

(56) References Cited

U.S. PATENT DOCUMENTS

| 4,110,285 | * | 8/1978 | Pons et al. ................... 260/29.6 MP |
| 5,081,270 | | 1/1992 | Pfister et al. . |
| 5,089,570 | * | 2/1992 | Rauterkus et al. . |
| 5,142,008 | | 8/1992 | Hölle et al. . |
| 5,889,101 | * | 3/1999 | Schlarb et al. ....................... 524/460 |

FOREIGN PATENT DOCUMENTS

| 2165468 | * | 7/1973 | (DE) ................................ C08F/1/09 |
| 0 221 498 | | 5/1987 | (EP) . |
| 221498 | * | 5/1987 | (EP) . |
| 0 469 372 | | 2/1992 | (EP) . |
| 0 727 441 | | 8/1996 | (EP) . |
| 3-234704 | * | 10/1991 | (JP) ................................. C08F/2/24 |
| 9610593 | * | 4/1996 | (WO) ............................. C08F/26/06 |

* cited by examiner

*Primary Examiner*—David W. Wu
*Assistant Examiner*—Kelechi C. Egwim
(74) *Attorney, Agent, or Firm*—Oblon, Spivak, McClelland, Maier & Neustadt, P.C.

(57) ABSTRACT

An aqueous polymer dispersion obtainable by emulsion polymerization of a monomer mixture A) comprising from 50 to 100% by weight of $C_1$–$C_{18}$ alkyl (meth)acrylates, vinyl esters, vinylaromatic compounds, or mixtures thereof, in the presence of a protective colloid B) composed of $b_1$) from 2 to 40% by weight of ethylenically unsaturated copolymerizable compounds (monomers) having at least one phosphate or phosphonate group $b_2$) from 0 to 98% by weight of $C_1$–$C_{18}$ alkyl (meth) acrylates, vinyl esters or vinylaromatic compounds $b_3$) from 0 to 50% by weight of further monomers, the amounts by weight being based on the protective colloid.

6 Claims, No Drawings

ANTICORROSION BINDERS COMPRISING PHOSPHATE OR PHOSPHONATE GROUPS

The invention relates to an aqueous polymer dispersion obtainable by emulsion polymerization of a monomer mixture A) comprising from 50 to 100% by weight of $C_1-C_{18}$ alkyl (meth)acrylates, vinyl esters, vinylaromatic compounds, or mixtures thereof, in the presence of a protective colloid B) composed of

- $b_1$) from 2 to 40% by weight of ethylenically unsaturated copolymerizable compounds (monomers) having at least one phosphate or phosphonate group
- $b_2$) from 0 to 98% by weight of $C_1-C_{18}$ alkyl (meth)acrylates, vinyl esters or vinylaromatic compounds
- $b_3$) from 0 to 50% by weight of further monomers, the amounts by weight being based on the protective colloid.

The invention additionally relates to anticorrosion coating compositions comprising the aqueous polymer dispersion.

Phosphate-functional binders for anticorrosion coating compositions are known, for example, from EP-A-305850 and EP-A-221498. The binders of EP-A-305850 are solution polymers prepared by polymerization in an organic solvent and subsequently dispersed in water. The molecular weights of such solution polymers are generally low, and for this reason alone their polymers are less suitable for coating compositions having good performance properties. The binders of EP-A-221498 are copolymers whose comonomers include specific, surface-active phosphates with polyether groups.

Emulsion polymers prepared in the presence of a protective colloid are known, for example, from EP 727441.

There is a desire for anticorrosion binders which offer good corrosion protection with a low content of phosphate or phosphonate groups.

It should be possible if appropriate to do without additional anticorrosion pigments. The polymers should be very easy to prepare, and readily available monomers should be used in particular. The aqueous polymer dispersions obtained should be stable and largely free of coagulum, while the resulting coatings should exhibit good performance properties, examples being high hardness and elasticity.

The binders known to date for anticorrosion coatings do not go a sufficient way toward meeting these requirements.

It is an object of the present invention, therefore, to provide binders for anticorrosion coatings which go as far as possible toward meeting the various requirements set out above.

We have found that this object is achieved by the polymer dispersion defined at the outset and by anticorrosion coating compositions which comprise the polymer dispersion.

The aqueous polymer dispersion is preferably prepared by emulsion polymerization of the monomer mixture A) in the presence of a protective colloid B).

The term monomer as used below represents free-radically copolymerizable compounds having at least one ethylenically unsaturated group.

The protective colloid contains preferably from 5 to 35% by weight and, with particular preference, from 10 to 20% by weight of the monomers $b_1$).

The protective colloid consists in particular, for example, of from 5 to 35, preferably from 10 to 20% by weight of monomers $b_1$) from 60 to 95, preferably from 70 to 90% by weight of monomers $b_2$) from 0 to 30, preferably from 0 to 20% by weight of monomers $b_3$).

These amounts by weight are based in each case on the protective colloid B).

Monomers $b_1$) are those having a phosphate or phosphonate group and at least one, preferably copolymerizable, ethylenically unsaturated group. The molecular weight of suitable monomers $b_1$) is preferably below 1000 g/mol, with particular preference below 500 g/mol and, with very particular preference, below 280 g/mol. Phosphate groups are groups of the formula

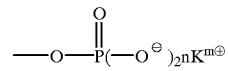

I

Phosphonate groups are groups of the formula

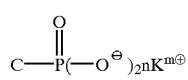

II

K in the above formulae is a cation, n and m are each 1 or 2, and the product n·m=2. K can be an alkali metal or ammonium, for example.

Suitable monomers $b_1$) with phosphonic acid groups are, for example, vinylphosphonic acid, 2-methacrylamido-2-methylpropanephosphonic acid, propene-2-phosphonic acid or α-phosphonostyrene.

Examples of monomers containing phosphoric acid groups are monoesters of phosphoric acid with compounds obtainable from diols and acrylic or methacrylic acid by monoesterification, such as 2-hydroxyethyl methacrylate, hydroxypropyl (meth)acrylate, 4-hydroxybutyl acrylate and 2-hydroxybutyl acrylate.

Prior to or during the transfer of the protective colloid to the aqueous phase the acids are neutralized—that is, the acid groups are converted to salt groups, as set out in detail later on below.

Examples of monomers $b_2$) (principal monomers) are (meth)acrylic acid alkyl esters having a $C_1-C_9$, especially $C_1-C_8$, alkyl radical, such as methyl methacrylate, methyl acrylate, n-butyl acrylate, ethyl acrylate, 2-ethylhexyl acrylate, n-butyl methacrylate, lauryl (meth)acrylate or stearyl (meth)acrylate.

Mixtures of the (meth)acrylic acid alkyl esters are also suitable, in particular.

Examples of vinyl esters of $C_1-C_{20}$ carboxylic acids are vinyl laurate, stearate, propionate and acetate.

Suitable vinylaromatic compounds are vinyltoluene, α- and p-methylstyrene, α-butylstyrene, 4-n-butylstyrene, 4-n-decylstyrene and, preferably, styrene.

The monomers $b_2$) are also preferably employed in a mixture.

Vinylaromatic compounds such as styrene are frequently employed, for example, as a mixture with $C_1-C_{18}$-alkyl (meth)acrylates, especially with $C_1-C_8$-alkyl (meth) acrylates.

Examples of further ethylenically unsaturated monomers $b_3$) are hydroxyl-containing monomers such as hydroxyalkyl (meth)acrylates, examples being hydroxypropyl or hydroxyethyl (meth)acrylate, amides or substituted amides of ethylenically unsaturated mono- or dicarboxylic acids, examples being acrylamide, methacrylamide, N-methylolacrylamide and N-methylolmethacrylamide, and also the N-methylolacrylamides and N-methylolmethacrylamides that are etherified with $C_1-C_6$-monohydric alcohols. While it is possible to include crosslinking monomers, having, for example, two vinyl groups, it is preferred for the protective colloid B not to contain any crosslinking monomers or at most only small proportions of these monomers—for example, less than 0.2% by weight, based on the protective colloid B. Further monomers $b_3$) include those having carboxylic acid, sulfonic acid, acid anhydride or amide groups, which contribute to the emulsifying action of the protective colloid B); however, it is not necessary to use such monomers, since monomers $b_1$) have a sufficient emulsifying action.

Mention may also be made of nitriles, vinyl halides, and nonaromatic hydrocarbons.

The weight-average molecular weight ($M_w$) of the protective colloid B) is preferably more than 10,000, with particular preference from 20,000 to 200,000 and, with very particular preference, from 40,000 to 120,000 (determined by gel permeation chromatography using polystyrene as standard and tetrahydrofuran as eluent).

The protective colloid B) can be prepared, for example, by bulk polymerization, i.e., without solvent, or, preferably, by solution polymerization.

The protective colloids B) prepared by bulk or solution polymerization are preferred because the polymers are relatively uniform in composition and include, incorporated in them, a hydrophobic (oil-soluble) initiator.

Examples of suitable solvents are those having a boiling point of less than 100° C. at 1 bar or those which together with water form an azeotrope which can easily be removed by distillation, if desired, from the aqueous polymer dispersion. Advantageously, it is also possible for the solvents used to include what are known as film-forming auxiliaries, such as butyl glycol, butyl diglycol or butoxypropanol. In this way, it is unnecessary to add these auxiliaries later.

Examples of suitable solvents that may be mentioned are butanol, isobutanol, propanol, ethanol, methanol and methyl ethyl ketone.

The polymerization of the ethylenically unsaturated monomers can be carried out, for example, in a conventional manner by anionic or, preferably, free-radical polymerization, preferably in the presence of initiators. Examples of free-radical initiators that may be mentioned are azobiscarboxamides, azobiscarbonitriles, peracid esters, or peroxides. The amount of initiator is preferably from 0.2 to 5, with particular preference from 0.5 to 3% by weight, based on the monomers. The polymerization temperature is preferably from 50 to 150° C., with particular preference from 80 to 130° C. If desired it is also possible to add regulators, examples being mercaptoethanol, tert-dodecyl mercaptan or diisopropylxanthogen sulfide, preferably an amounts of from 0 to 3% by weight, based on the monomers.

The protective colloid B) can, for example, also be prepared in a single-stage or multistage operation. In particular, for example, it is possible first to prepare a polymer having a high acid content and then, in the presence of the first polymer, to prepare a polymer having a lower acid content (or an acid number of 0), as is described, for example, in EP-A 320 865.

In the case of the present invention, such a multistage preparation is unnecessary, and so single-stage preparation is preferred. The monomers can be included in the initial charge to the polymerization vessel or else (preferably) metered in continuously during the polymerization.

The protective colloid B) is obtained as a dispersion or, preferably, a solution in the organic solvent. The solids content is preferably from 50 to 95, especially from 60 to 85% by weight.

The protective colloid B) is then used as a protective colloid in the emulsion polymerization.

The protective colloid B) can be used in the form of its organic solution in the case, for example, of solution polymerization, or else without solvent, in the case, for example, of bulk polymerization. Alternatively, it can be converted first of all into an aqueous dispersion or solution, any solvents being removed by distillation if desired.

For the emulsion polymerization, the protective colloid B) can be introduced as an initial charge in water and/or can be added during the emulsion polymerization.

Prior to or during its transfer to the aqueous phase, some or all of the acid groups or anhydride groups of the polymeric protective colloid are converted into salt groups—in other words neutralized.

Suitable neutralizing agents are, firstly, mineral bases, such as sodium carbonate or potassium carbonate and ammonia, and secondly organic bases, such as amino alcohols, for example, especially 2-amino-2-methyl-1-propanol (AMP), triethanolamine, triisopropanolamine (TIPA), monoethanolamine, diethanolamine, tri[(2-hydroxy)-1-propyl]amine, 2-amino-2-methyl-1,3-propanediol (AMPD) or 2-amino-2-hydroxymethyl-1,3-propanediol, and also diamines, such as lysine, for example. Ammonia is particularly preferred as a neutralizing agent.

The proportion by weight of the protective colloid B) is preferably from 5 to 40 parts by weight, with particular preference from 5 to 25 parts by weight, based on 100 parts by weight of the monomer mixture A).

In the emulsion polymerization, no further emulsifiers, protective colloids or other dispersing auxiliaries are required and therefore, preferably, none is employed either.

The monomers of the monomer mixture A) that are to be polymerized essentially comprise the abovementioned monomers $b_1$) to $b_3$), other suitable monomers $b_2$) being aliphatic hydrocarbons having 2 to 8 carbon atoms and two double bonds and other suitable monomers $b_3$) being crosslinking monomers such as butanediol diacrylate and divinylbenzene.

The monomers $b_2$) (principal monomers) make up preferably from 60 to 100, with particular preference from 70 to 100 and, with very particular preference, from 80 to 100% by weight of the monomer mixture A).

It is possible though not absolutely necessary to use monomers $b_1$); however, the proportion of these monomers is generally in each case below 10% by weight, preferably below 5% by weight and, with particular preference, below 3% by weight.

It is also possible to use further monomers $b_3$) as well in amounts, for example, of from 0 to 40% by weight, preferably from 0 to 30% by weight and, with particular preference, from 0 to 20% by weight. These amounts by weight are based on the monomer mixture A).

The glass transition temperature (Tg) of the polymer composed of the monomer mixture A) is preferably from 0 to 100° C., and, with particular preference, from 5 to 70° C.

In this context, the Tg is calculated from the Tg of the homopolymers of the monomers of the monomer mixture A by the method of Fox. (T. G. Fox, Bull. Am.Phys. Soc. Ser II, 1 (1956)123)

$$\frac{1}{Tg} = \frac{X_A}{Tg(A)} + \frac{X_B}{Tg(B)} + \ldots$$

$Tg_{(A)}, _{(B)}$: Tg of the homopolymer of monomer (A) or (B)
$X_A$, $X_B$: mass fraction of the monomer (A), (B)

The emulsion polymerization can be conducted in a conventional manner at temperatures, for example, of from 30 to 95° C. in the presence of a water-soluble initiator.

Examples of suitable initiators are sodium, potassium and ammonium persulfates, tert-butyl hydroperoxides, water-soluble azo compounds, and redox initiators.

In the case of hydrogen peroxide as an initiator it is preferred to use small amounts of Cu(II) or Fe(III) as catalyst as well.

The aqueous polymer dispersion of the invention obtained by emulsion polymerization preferably has a solids content of from 10 to 65, preferably from 30 to 60 and, with particular preference, from 40 to 55% by weight.

The aqueous dispersions of the invention are suitable as coating compositions, impregnating compositions or adhesives. They can comprise additives customary for the particular application, examples being defoamers, flow control agents, pigments, extenders or fillers, dyes, thickeners, etc.

As coating compositions they can be used, for instance, to coat substances made, for example, of metal, wood, stone, paper or plastic, and as web binders for the impregnation and/or binding of woven or nonwoven fibers.

The polymer dispersions of the invention constitute, in particular, physically drying systems; in other words, the systems are applied as coating compositions and dried at room temperature (23° C.) and an increase to above room temperature or above 50° C. does not take place.

The aqueous polymer dispersion is particularly suitable as a binder for anticorrosion coating compositions. Anticorrosion coating compositions of the invention can consist of the binder—i.e., of the aqueous polymer dispersion—alone.

Further possible constituents are the abovementioned additives and, in particular, anticorrosion pigments—for example, barrier pigments, such as micaceous iron, aluminum pigments, or active anticorrosion pigments, such as zinc phosphate. Barrier pigments hinder the diffusion of water or oxygen into the paint film. Active anticorrosion pigments suppress the corrosion process electronically.

However, it is an advantage of the aqueous polymer dispersions that even with small amounts of anticorrosion pigments or else entirely without active anticorrosion pigments, or anticorrosion pigments in general, there is in any case good protection against corrosion—that is, in particular, virtually no subfilm corrosion and blistering in the coating. Where anticorrosion pigments are used, their proportion is from 10 to 100 parts by weight per 100 parts by weight of resultant polymer (sum of protective colloid B and polymerized monomer mixture A).

The aqueous polymer dispersions of the invention are stable and virtually free of coagulum. The coatings obtained with the polymer dispersions of the invention have good performance properties—in particular, they possess high hardness and elasticity.

EXAMPLES

A) Preparing the Protective Colloid B) by Solution Polymerization (see Table 1)

In a glass flask fitted with reflux condenser, anchor stirrer, two dropping funnels and thermostated oil bath the initial charge was heated to a temperature of 105° C. under a nitrogen atmosphere and with stirring. After this temperature has been reached, feedstream 2 was started and was metered in over the course of 6 hours. 15 minutes after the start of feedstream 2, feedstream 1 was started and metered in over the course of 4 hours.

After all of feedstream 2 had been metered in, polymerization was completed by stirring at 105° C. for 2 hours more. The polymer solution was then cooled to 80° C. and was neutralized by the stirred incorporation of feedstream 3 over the course of 20 minutes. Subsequently, feedstream 4 was stirred in over the course of 1 hour at a constant external temperature of 80° C.

In the example in accordance with the invention, the protective colloid contains 15% by weight of vinylphosphonic acid. The comparative example contains the equimolar amount of acrylic acid, namely 10% by weight.

B) Preparing the Aqueous Dispersion by Emulsion Polymerization (see Table 2)

The initial charge was heated to the polymerization temperature of 85° C. under nitrogen. During this heating operation, feedstream 1 was metered in over the course of 15 minutes. Then feedstream 2 was metered in over the course of 2 hours and feedstream 3 over the course of 2.5 hours. The stirring was continued at the polymerization temperature for one hour subsequently. The dispersion was then filtered (500 μm mesh size)

TABLE 1

Preparing the protective colloid

|  | C1 for comparison | 1 |
|---|---|---|
| Composition in % by wt. | | |
| Acrylic acid | 10 | 0 |
| Vinylphosphonic acid | 0 | 15 |
| n-Butyl acrylate | 60 | 56.7 |
| Methyl methacrylate | 30 | 28.3 |
| Initial charge: | | |
| Isobutanol | 136 g | 136 g |
| Portion of feedstream 1 | 144 g | 146 g |
| Feedstream 1: | | |
| Acrylic acid | 80 g | — |
| Vinylphosphonic acid | — | 133.3 g (90% strength) |
| n-Butyl acrylate | 480 g | 453.4 g |
| Methyl methacrylate | 240 g | 226.6 g |
| Feedstream 2: | | |
| Isobutanol | 192 g | 192 g |
| tert-Butyl peroctoate | 16 g | 16 g |
| Feedstream 3: | | |
| Aqueous ammonia solution (25% by weight) | 75.6 g | 151.1 g |
| Feedstream 4: | | |
| Water | 1600 g | 1600 g |
| Product: | | |
| Solids content [%] | 29.3 | 27.1 |
| pH | 8.7 | 8.9 |
| Isobutanol content [%] | 11.6 | 11.3 |
| Appearance | clear | turbid |

TABLE 2

Preparing the polymer dispersion

| | Example | | | | |
|---|---|---|---|---|---|
| | D1* | D2* | D3 | D4 | D5 |
| Initial charge: | | | | | |
| Solution C1 | 512 g | 512 g | | | |
| Solution 1 | | | 553.6 g | 553.6 g | 553.6 g |
| Feedstream 1: | | | | | |
| Water | 675 g | 675 g | 675 g | 675 g | 675 g |
| Copper vitriol | 0.02 g | 0.02 g | 0.02 g | 0.02 g | 0.02 g |
| Feedstream 2: | | | | | |
| n-Butyl acrylate | 385 g | 350 g | 385 g | 350 g | 315 g |
| Styrene | 465 g | 500 g | 465 g | 500 g | 535 g |

TABLE 2-continued

Preparing the polymer dispersion

| | \multicolumn{5}{c}{Example} |
|---|---|---|---|---|---|
| | D1* | D2* | D3 | D4 | D5 |
| Feedstream 3: | | | | | |
| Hydrogen peroxide (12% strength) | 83 g | 83 g | 83 g | 83 g | 83 g |
| Dispersion: | | | | | |
| Solids content [%] | 47.2 | 46.6 | 46.5 | 46.3 | 47.2 |
| pH | 8.3 | 8.4 | 8.1 | 8.2 | 8.0 |
| Isobutanol content [%] | 2.9 | 2.9 | 2.9 | 2.9 | 2.9 |
| LT** | 50 | 48 | 47 | 46 | 36 |

*for comparison
**LT: turbidity of the dispersion or solution with a polymer content of 0.01% by weight relative to water, determined by measuring the photocurrent. The LT is the light transmission in % (the greater the LT, the smaller the polymer particles).

C) Preparing the Coating Compositions (see Table 3)

TABLE 3

Formulating the anticorrosion coating compositions (amounts in parts by weight)

| Polymer dispersion, type | D1 | D2 | D3 | D4 | D5 |
|---|---|---|---|---|---|
| Polymer dispersion, parts by wt. | 95.2 | 96.5 | 96.7 | 97.1 | 95.2 |
| Surfynol 104, 50% strength in n-propanol[1] | 1.2 | 1.2 | 1.2 | 1.2 | 1.2 |
| Agitan 260[2] | 0.6 | 0.6 | 0.6 | 0.6 | 0.6 |
| Water | 11.7 | 11.7 | | | |
| Pigment dispersant (LR8807) | 1.46 | 1.46 | — | — | — |
| Aqueous ammonia solution (25% strength) | 2.19 | 2.19 | 2.4 | 1.55 | 0.87 |
| Aerosil 200[3] | 0.48 | 0.48 | 0.48 | 0.48 | 0.48 |
| Bayferrox 130 M[4] | 29.9 | 29.9 | 29.9 | 29.9 | 29.9 |
| Millicarb[5] | 47.8 | 47.8 | 47.8 | 47.8 | 47.8 |
| The ingredients are admixed with glass beads and the batch is stirred in a dissolver for 20 minutes. Then the following components are incorporated by stirring: | | | | | |
| Polymer dispersion | 47.1 | 47.7 | 47.8 | 48.0 | 47.0 |
| Agitan 260 | 0.6 | 0.6 | 0.6 | 0.6 | 0.6 |
| Solvesso 100[6] | 3.4 | 3.4 | 3.4 | 11.8 | 16.4 |
| After waiting for 1 day, the paint is adjusted to the desired viscosity of about 300 mPas by adding a thickener and water: | | | | | |
| Polyether thickener | 1.3 | 1.3 | 1.56 | 1.1 | 0.6 |
| Water | 65.9 | 75.8 | 51.4 | 33.9 | 67.9 |

[1]Defoamer (Air Products)
[2]Defoamer (Münzing-Chemie)
[3]Silicate (Degussa)
[4]Iron oxide (Bayer)
[5]Calcium carbonate (Omya)
[6]Film-forming auxiliary The dispersions of the invention were formulated without pigment dispersants. The paints of the comparative examples had to be formulated with pigment dispersant since without it they gave only unsuitable, porous paint films which could not be tested in the salt spray test.

D) Performance Testing

The paints prepared in this way were applied by spraying to steel panels using a manual spray gun, the dry film thickness of the paint being 80 μm. The coated metal panels were dried at room temperature for 7 days and then at 50° C. for 1 day. The substrate was sheet iron (ST 1405, cleaned with ethyl acetate). The dried paint was damaged by scribe-marking it with a knife. The salt spray test was carried out In accordance with DIN 53 167. The results are set out in the table below:

TABLE 4

Composition of the coating compositions and test results (salt spray test, after exposure for 120 hours, film thickness 80 μm (dry))

| | D1* | D2* | D3 | D4 | D5 |
|---|---|---|---|---|---|
| Protective colloid | | | | | |
| Acrylic acid | 10 | 10 | | | |
| Vinylphosphonic acid | | | 15 | 15 | 15 |
| Butyl acrylate | 60 | 60 | 57 | 57 | 57 |
| Methyl methacrylate | 30 | 30 | 28 | 28 | 28 |
| Amount of protective colloid [% by wt] | 15 | 15 | 15 | 15 | 15 |
| Emulsion polymerization: | | | | | |
| Styrene | 55 | 59 | 55 | 59 | 63 |
| Butyl acrylate | 45 | 41 | 45 | 41 | 37 |
| Assessment of the coated metal panels after 120 h salt spray testing: | | | | | |
| Blistering [%]** | 60 | 80 | 0 | 0 | 0 |
| Scribe washout [rating]*** | 4 | 4 | 3 | 3 | 3 |
| Scribe creep [rating]**** | 4–5 | 5 | 3 | 3–4 | 3 |

*for comparison
**percent of the surface bearing blisters
***scribe washout: the parameter assessed is the washing-out of rust, evident from the brown coloration of the edge of the scribe mark:
Rating 0–5
0 = no washout,
5 = severe washout
****scribe creep 0–5 (evident from deformation of the paint surface):
0 = no rust creep
5 = severe rust creep In the salt spray test, the anticorrosion paints based on the binder of the invention exhibit no blistering, minimal rust washout and a relatively low level of scribe creep.

D) Further Comparative Examples

For comparison with the dispersions of the invention, dispersions were prepared by emulsion polymerization. In this case, the vinylphosphonic acid was employed as a comonomer in the emulsion polymerization. The monomer composition of these comparative experiments corresponds to that of the examples in accordance with the invention.

| | \multicolumn{3}{c}{Comparative Example No.} | | |
|---|---|---|---|
| | E 1 | E 2 | E 3 |
| Feedstream 1: | | | |
| Lutensit AEP (20% strength in water) | 31.5 g | 31.5 g | 31.5 g |
| Water | 250 g | 250 g | 250 g |
| Vinylphosphonic acid | 14.1 g | 14.1 g | 18.8 g |
| Methyl methacrylate | 26.6 g | 26.6 g | |
| n-Butyl acrylate | 293.8 g | 271.9 g | 262.5 g |
| Styrene | 290.7 g | 312.5 g | 343.8 g |

|  | Comparative Example No. | | |
| --- | --- | --- | --- |
|  | E 1 | E 2 | E 3 |
| Monomer composition % by wt. | | | |
| Vinylphosphonic acid | 2.25 | 2.25 | 3 |
| Methyl methacrylate | 4.25 | 4.25 | — |
| n-Butyl acrylate | 47 | 43.5 | 42 |
| Styrene | 46.5 | 50 | 55 |
| Coagulum after emulsion polymerization, % by wt., based on solids content | 16 | 100 | 100 |

Procedure: The initial charge, consisting of 9.5 g of Lutensit AEP (20% strength in water) and 400 g of water, was heated to 84° C. under a nitrogen atmosphere and with stirring. Then 5% of feedstream 1 and 5% of feedstream 2, consisting of 3.1 g of sodium peroxodisulfate and 75 g of water, were metered in over the course of 2 minutes. The mixture was subjected to initial polymerization for 15 minutes while heating it to 95° C. Then, at 95° C., the remainders of feedstreams 1 and 2 were metered in over the course of 2 hours and polymerization was continued for 1 hour. The dispersion was then neutralized by stirred incorporation of 17.5 g of aqueous ammonia solution (25% strength), cooled, and filtered through a 500 μm sieve.

Lutensit AEP: Acidic phosphoric ester of a fatty alcohol alkoxylate from BASF AG. For the experiments described above, the emulsifier was neutralized with ammonia.

The 3 Comparative Examples are unsuitable for testing as anticorrosion binders.

We claim:

1. An aqueous polymer dispersion obtained by emulsion polymerization of a monomer mixture A) comprising from 50 to 100% by weight of $C_1$–$C_{18}$ alkyl (meth)acrylates, vinyl esters, vinylaromatic compounds, or mixtures thereof, in the presence of a protective colloid B) composed of $b_1$) from 2 to 40% by weight of ethylenically unsaturated copolymerizable compounds (monomers) having at least one phosphate or phosphonate group $b_2$) from 0 to 98% by weight of $C_1$–$C_{18}$ alkyl (meth) acrylates, vinyl esters or vinylaromatic compounds $b_3$) from 0 to 50% by weight of further monomers, the amounts by weight being based on the protective colloid wherein the sum of the % by weight of $b_1$+$b_2$+$b_3$ is 100% of the total amount of protective colloid B.

2. A polymer dispersion as claimed in claim 1, wherein the content of the protective colloid B) is from 5 to 40 parts by weight, based on 100 parts by weight of monomer mixture A).

3. A polymer dispersion as claimed in claim 1, wherein the content of monomers $b_1$) is from 5 to 35% by weight, based on the protective colloid.

4. An anticorrosion coating composition comprising as binder a polymer dispersion as claimed in claim 1.

5. An anticorrosion coating composition as claimed in claim 4 containing no active anticorrosion pigments.

6. A substrate coated with an anticorrosion coating composition as claimed in claim 4.

\* \* \* \* \*

UNITED STATES PATENT AND TRADEMARK OFFICE
CERTIFICATE OF CORRECTION

PATENT NO. : 6,218,456 B1
DATED : April 17, 2001
INVENTOR(S) : Schlarb et al.

It is certified that error appears in the above-identified patent and that said Letters Patent is hereby corrected as shown below:

<u>Title page, Item [54],</u>
<u>Column 1,</u>
The title should be:
[54]  -- ANTICORROSION BINDERS PREPARED IN THE PRESENCE OF PROTECTIVE COLLOIDS COMPRISING PHOSPHATE OR PHOSPHONATE GROUPS --

Signed and Sealed this

Sixth Day of November, 2001

Attest:

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,218,456 B1
DATED         : April 17, 2001
INVENTOR(S)  : Schlarb et al.

It is certified that error appears in the above-identified patent and that said Letters Patent is hereby corrected as shown below:

Title page,
Item [54], Title, should be:

-- ANTICORROSION BINDERS PREPARED IN THE PRESENCE OF PROTECTIVE COLLOIDS COMPRISING PHOSPHATE OR PHOSPHONATE GROUPS --

Signed and Sealed this

Twenty-first Day of September, 2004

JON W. DUDAS
*Director of the United States Patent and Trademark Office*